(12) United States Patent
Ives et al.

(10) Patent No.: US 10,943,032 B2
(45) Date of Patent: Mar. 9, 2021

(54) DATA ENCRYPTION AND DECRYPTION TECHNIQUES

(71) Applicant: EMC IP Holding Company LLC, Hopkinton, MA (US)

(72) Inventors: Stephen Richard Ives, West Boylston, MA (US); Ningdong Li, Acton, MA (US); Seema G. Pai, Shrewsbury, MA (US); Daniel J. Rodrigues, North Attleboro, MA (US); Scott Rowlands, Marietta, GA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 310 days.

(21) Appl. No.: 16/050,268

(22) Filed: Jul. 31, 2018

(65) Prior Publication Data

US 2020/0042748 A1 Feb. 6, 2020

(51) Int. Cl.
*G06F 21/79* (2013.01)
*G06F 21/60* (2013.01)

(52) U.S. Cl.
CPC .................... *G06F 21/79* (2013.01)

(58) Field of Classification Search
CPC .............. G06F 21/79; G06F 21/606
See application file for complete search history.

(56) References Cited

U.S. PATENT DOCUMENTS

| 2015/0178243 A1* | 6/2015 | Lowery ............... G06F 12/0653 709/212 |
| 2018/0088804 A1* | 3/2018 | Mummidi ............... G06F 3/061 |
| 2018/0260347 A1* | 9/2018 | Benisty ................. G06F 3/0688 |

* cited by examiner

*Primary Examiner* — Nelson S. Giddins
(74) *Attorney, Agent, or Firm* — Muirhead and Saturnelli, LLC

(57) ABSTRACT

Techniques for processing I/O operations may include performing DMA (direct memory access) operations between a data storage system, one or more physical storage devices, and a hardware component that communicate over at least one bus using a DMA-based protocol, such as NVMe (Non-Volatile Memory Express). The hardware device may perform encryption and decryption processing of data that is, respectively, stored to, and read from, physical non-volatile storage. The hardware device may optionally perform other processing for other data-related operations such as any of data validation and integrity checking, data deduplication, data compression, and data decompression. When performing DMA transfers, multiple descriptors, such as SGLs (scatter gather lists) or PRPs (physical region pages), for multiple data portions having logically contiguous consecutive logical addresses may be combined into a single descriptor sent in a single DMA operation.

20 Claims, 10 Drawing Sheets

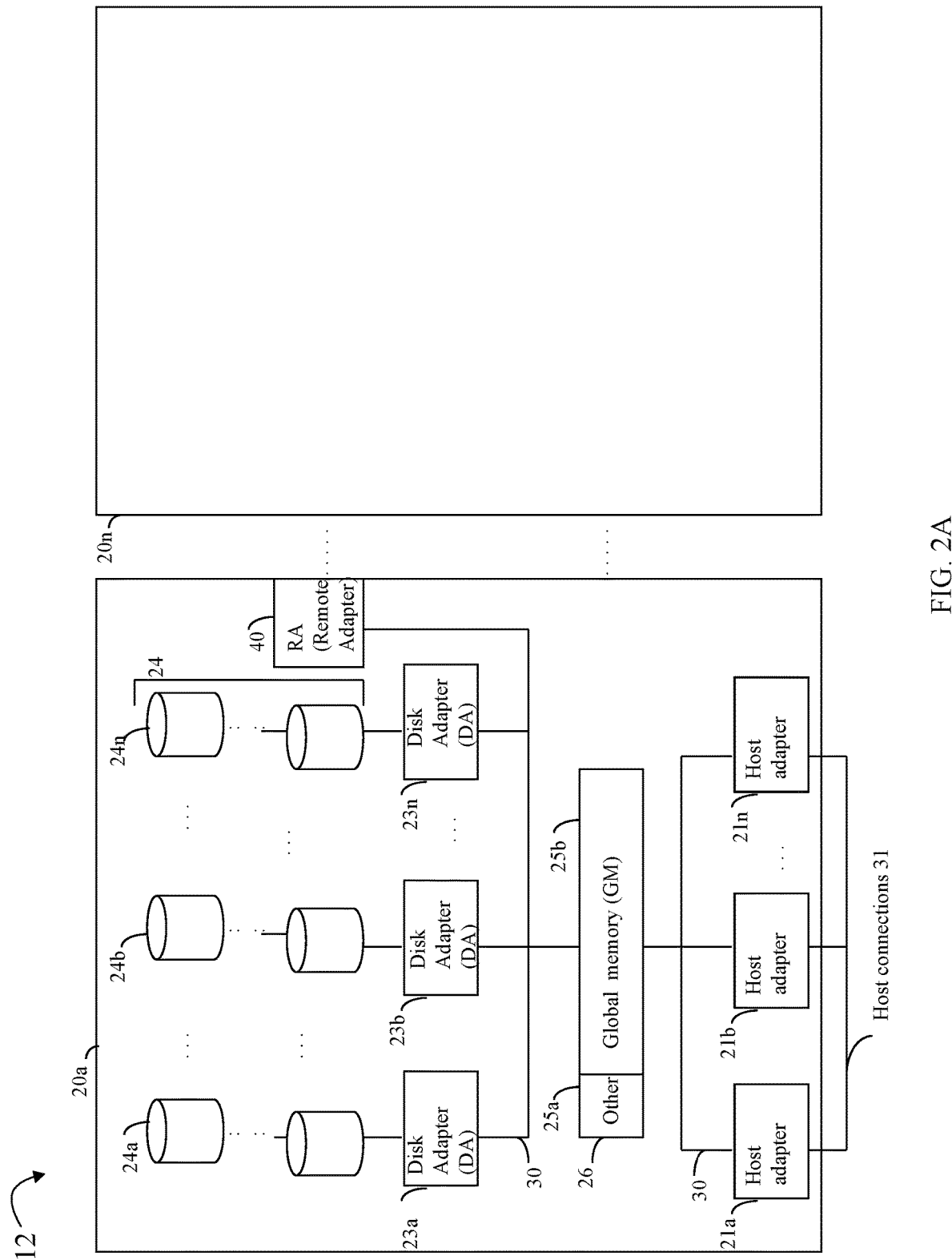

DATA ENCRYPTION AND DECRYPTION TECHNIQUES

BACKGROUND

Technical Field

This application generally relates to data storage and, in particular, to performing data related operations such as data encryption and decryption.

Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell EMC™. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of techniques herein is a method of processing I/O operations comprising: performing a first DMA (direct memory access) operation that transfers first data from a physical storage device to a first memory location of a data storage system, wherein the first data is stored in the first memory location in an encrypted form; performing at least a second DMA operation that transfers the first data in the encrypted form from the first memory location of the data storage system to a hardware device; performing first processing by the hardware device, the first processing including: decrypting the first data and generating decrypted first data; and performing at least one DMA operation that transfers the decrypted first data from the hardware device to at least one second memory location of the data storage system. The physical storage device may be a non-volatile memory device connected, over at least one communication bus, to the hardware device and the data storage system. The first DMA operation, the at least second DMA operation, and the at least one DMA operation may be performed using the at least one communication bus. The at least one second memory location may be the first memory location and after, transferring the decrypted first data, the decrypted first data may overwrite the first data stored at the first memory location in the encrypted form. The at least one second memory location may be a different memory location than the first memory location. The first data in the encrypted form may include a single descriptor that describes a plurality of data portions transferred by the first DMA operation. The plurality of data portions may be stored at contiguous consecutive logical addresses of a logical address range of a logical device. The single descriptor in the encrypted form may represent a plurality of descriptors, in the encrypted form, for the plurality of data portions represented by the single descriptor. The method may include: performing a plurality of DMA operations that transfer the plurality of descriptors in the encrypted form from the first memory location of the data storage system to a hardware device; and performing a plurality of DMA operations that transfer the plurality of descriptors from the hardware device to the at least one second memory location of the data storage system. The first processing may include the hardware device performing at least one of: data validation and integrity checking using metadata included in the first data, one or more processing operations of data deduplication processing, and one or more processing operations of decompression processing. The first DMA operation, the at least second DMA operation, the first processing, and the at least one DMA operation may be performed as operations of the I/O path for a read I/O operation. The method may include performing second processing of the I/O path for a write I/O operation that writes second data. The second processing may include: performing at least a third DMA operation that transfers second data from a third memory location of the data storage system to the hardware device, wherein the second data is stored in the third memory location in a decrypted form; performing third processing by the hardware device, the third processing including: encrypting the second data and generating encrypted second data; and performing at least a fourth DMA operation that transfers the encrypted second data from the hardware device to a target memory location of the data storage system; and performing a fifth DMA operation that transfers the encrypted second data from the target memory location of the data storage system to a second physical storage device of the data storage system. The second data may include a plurality of descriptors describing a plurality of data portions stored at contiguous consecutive logical addresses of a logical address space of a logical device. A single descriptor may represent the plurality of descriptors and denote a combined data representation of the plurality of data portions. The single descriptor may be included in the encrypted second data transferred by the fifth DMA operation. The plurality of data portions represented by the single descriptor may be written to the second physical storage device providing provisioned storage for the logical device. The third processing may include the hardware device performing at least one of: data validation and integrity checking using metadata included in the second data, computing a hash value in connection with data deduplication processing, and one or more processing operations of compression processing.

In accordance with another aspect of techniques herein is a computer readable medium comprising code stored therein that, when executed performs a method of processing I/O operations comprising: performing a first DMA (direct memory access) operation that transfers first data from a physical storage device to a first memory location of a data storage system, wherein the first data is stored in the first memory location in an encrypted form; performing at least a second DMA operation that transfers the first data in the encrypted form from the first memory location of the data storage system to a hardware device; performing first processing by the hardware device, the first processing including: decrypting the first data and generating decrypted first data; and performing at least one DMA operation that transfers the decrypted first data from the hardware device to at least one second memory location of the data storage system.

In accordance with another aspect of techniques herein is a system comprising: at least one processor; and a memory comprising code stored therein that, when executed, performs a method of processing I/O operations comprising: performing a first DMA (direct memory access) operation that transfers first data from a physical storage device to a first memory location of a data storage system, wherein the first data is stored in the first memory location in an encrypted form; performing at least a second DMA operation that transfers the first data in the encrypted form from the first memory location of the data storage system to a hardware device; performing first processing by the hardware device, the first processing including: decrypting the first data and generating decrypted first data; and performing at least one DMA operation that transfers the decrypted first data from the hardware device to at least one second memory location of the data storage system.

BRIEF DESCRIPTION OF THE DRAWINGS

Features and advantages of the present invention will become more apparent from the following detailed description of exemplary embodiments thereof taken in conjunction with the accompanying drawings in which:

FIG. 2A is an example of an embodiment of a data storage system;

DETAILED DESCRIPTION OF EMBODIMENT(S)

Figure 1:
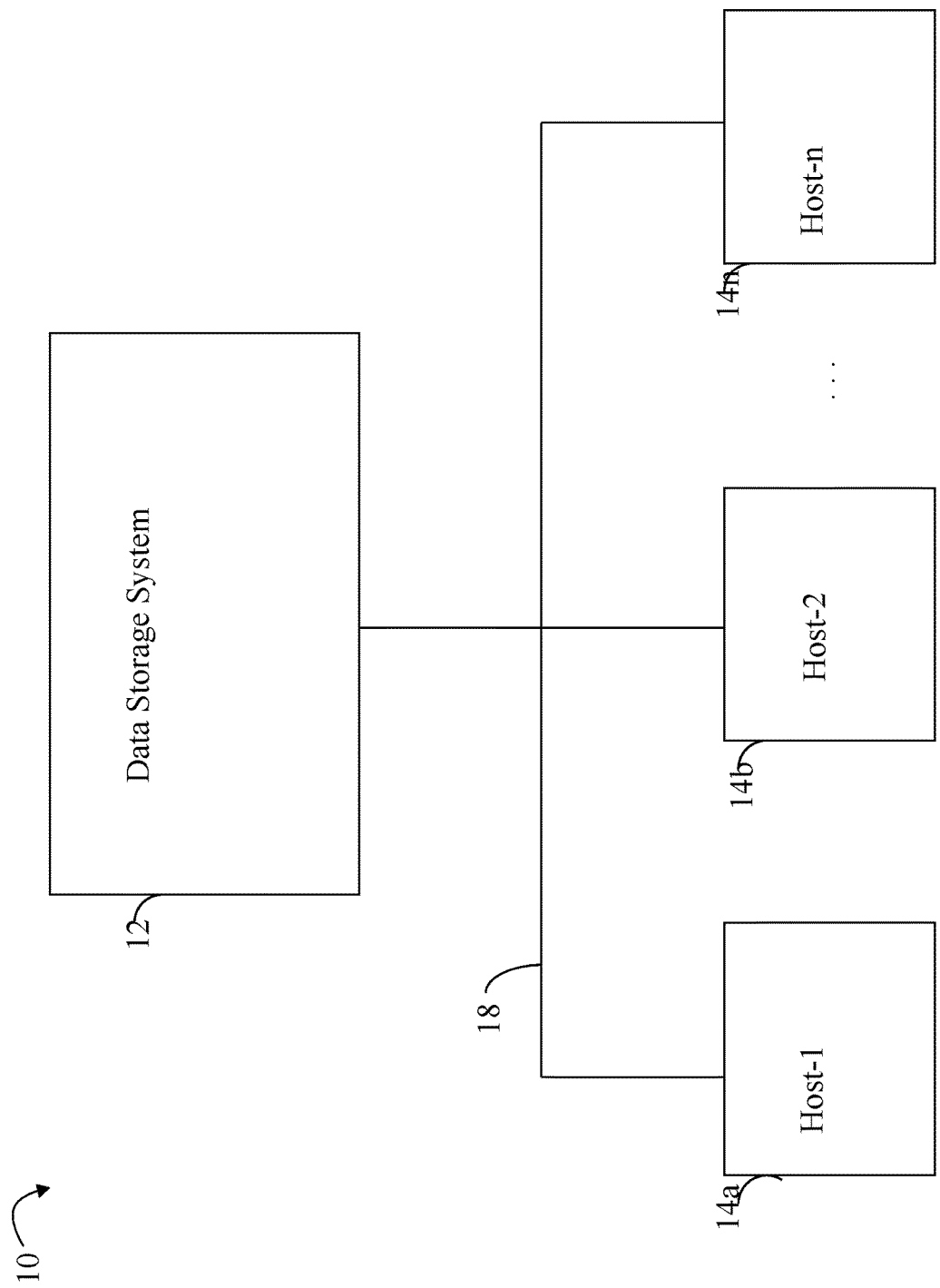
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel (FC), iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as a Dell EMC™ PowerMAX™ data storage system, as well one or more other data storage systems as may vary with the embodiment.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as by Dell EMC™, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the back-end physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by Dell EMC™, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device, such as a non-volatile storage device. Data residing on a disk drive or other physical storage device may be accessed by the DA following a data request in connection with I/O operations that other directors originate. The DA may also be further characterized in at least one embodiment as a controller providing access to external physical drives or storage devices located on one or more external data storage systems rather than local physical drives located in the same physical storage system as the DA (such as illustrated in FIG. 2A).

It should be noted that data storage system global memory, such as denoted by 25b in FIG. 2A, may denote a logical representation of global memory. As described in more detail elsewhere herein, the global memory of the data storage system, such as used in connection with data caching for I/O operations, may be implemented as a distributed global memory with different portions of the global memory local to different corresponding directors or adapters. In such an embodiment, all portions of the global memory may be generally accessible to all directors. Particular one or more portions of the global memory may be local with respect to a particular director with remaining non-local portions of the global memory accessible to the particular director using a communications fabric, such as an Infiniband (IB) fabric. The foregoing as may be included in at least one embodiment of techniques herein is described in more detail below.

Figure 2B:
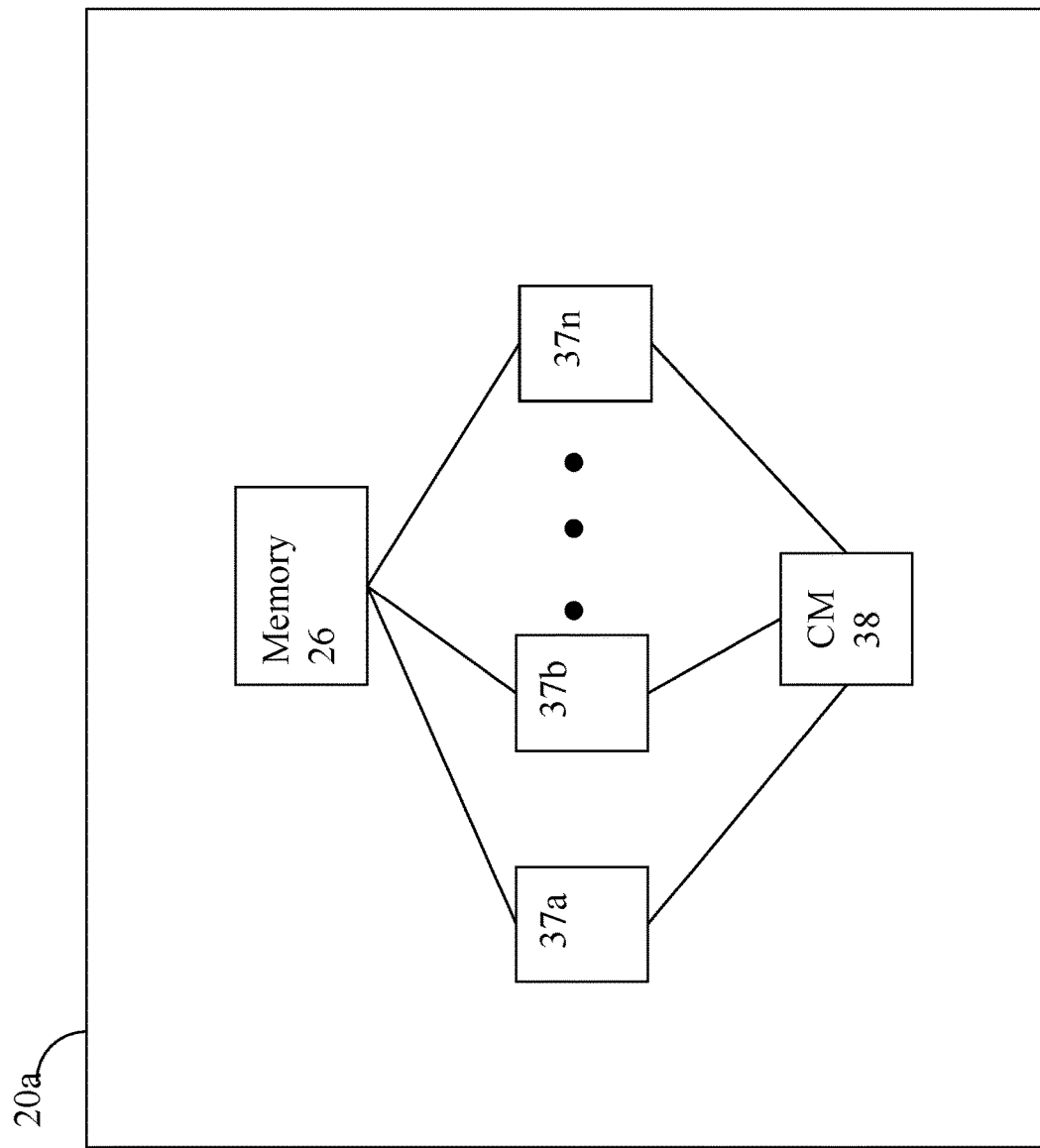
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Data storage systems may perform data services such as, for example, encryption and decryption of data stored on PDs. For at least some data storage customers, it is a critical security requirement to store data on PDs in an encrypted form. One option may be to store data on PDs which are self-encrypting devices or drives (SEDs). As known in the data storage industry, SEDs have built-in data encryption and decryption capability within the PD. However, many PDs (e.g. non-volatile memory or storage devices) used as the backend non-volatile storage devices lack such built-in data encryption and decryption capability. One drawback of PDs that are SEDs with built-in data encryption and decryption capability is that such PDs often have an increased cost over non-SEDs. Additionally, the SEDs must be supported in the customer's particular data storage system associated configuration and protocols used. For example, a data storage system may use PDs that communicate with the data storage system and its components (e.g., DA) in accordance with the NVMe (Non-Volatile Memory Express) protocol (also discussed in more detail elsewhere herein). Such NVMe PDs may lack any built-in data encryption and decryption. As such, SEDs may not be an option if unsupported or unavailable for use in the customer's data storage system. Further, the associated additional cost of SEDs, if available and supported in the customer's data storage system, may be undesirable.

Another option to provide encryption/decryption of data is to perform software-based encryption where code is executed using processors or CPUs of the data storage system to perform any desired encryption or decryption. However, the foregoing may result in unacceptably low performance of I/O processing since available processor or CPU execution time is allocated to servicing I/O operations along with the additional processing for performing encryption/decryption (which can be computational expensive).

As such, described in following paragraphs are techniques that provide a more cost-effective and flexible approach to perform encryption and decryption using another hardware (HW) device. In at least one embodiment, the HW device may be a dedicated HW device used to perform only desired encryption and decryption of data stored on PDs of the data storage system. In at least one embodiment, the HW device may be a dedicated HW device which provides only a selected or specified set of one or more data operations or services, such as part of the I/O data path or runtime stack. In such an embodiment, the HW device may perform encryption, decryption and optionally one or more other specified operations or data-related services such as, for example, generation of hashes (e.g., hashing values) or digests based on the I/O data where such hashes may be used with data deduplication; data integrity and validity checking such as based on checksums or other techniques used to detect data corruption or invalid data; compression of data stored on PDs; and decompression of data read from PDs. In this manner, the encryption and decryption processing, as well as any optional additional specified services and operations, may be performed by the additional HW device thereby using processors or CPUs of the additional HW device rather than processors or CPUs of the data storage system, or other components of the data storage system. In such an embodiment, the specified operations and services (e.g., including at least encryption and/or decryption) may be collectively performed on a particular data portion while the single data portion is stored a memory location of the data storage system without having to repeatedly load the same particular data portion multiple times for the multiple specified operations and services.

Additionally, such techniques may be used with a DMA (direct memory access)-based protocol such as NVMe used for communication between the PDs and the data storage system (e.g., between the DA and the PDs). In at least one embodiment, the HW device may perform any desired decryption of data read from a PD and encryption of data written to a PD. The encryption and decryption of data may be performed inline as part of the I/O path or data path when processing, respectively, write and read operations (e.g., write to PD, read from PD). As known in the art, the data path or I/O path is the runtime call stack or chain of code executed in connection with performing I/O processing of a received client I/O (e.g., such as to read and/or write data to a storage entity (e.g., block-based I/O directed to a logical device, or file-based I/O directed to a file-based entity such as a file, file system, or directory).

In at least one embodiment, PDs of the data storage system may include non-volatile storage devices that are connected to, and communicate over, a PCIe bus. Generally, the PDs may communicate with other components also connected to the PCIe bus. In at least one embodiment, the PDs, and more generally, devices or components connected to the PCIe bus, may communicate over the PCIe bus in accordance with a standard or protocol such as NVMe. NVMe may be characterized as an open logical device interface specification for accessing non-volatile storage media (e.g., such as PDs operating in accordance with the NVMe protocol) attached to the PCIe bus. The protocol used for communication over the PCIe bus may be a DMA (direct memory access)-based protocol such as NVMe which supports DMA operations when reading and writing data over the PCIe bus between devices, systems and components connected to the PCIe bus. With NVMe or possibly another supported DMA-based protocol, DMA data transfers (e.g., reads and writes) performed over the PCIe bus may directly access the memory of the devices (e.g., such as memory of the DA and, more generally, memory such as cache locations of the data storage system) connected to the PCIe bus to perform such I/O operations. DMA enables low-latency peer-to-peer data transfers between systems, devices and components on the PCIe bus. Systems, components and devices supporting DMA that are connected to the PCIe bus can directly access the memory of peer systems, devices and components connected to the PCIe bus when performing read and write operations. Such DMA-based read and write operations are performed and allow direct access, for example, a memory of a system such as the data storage system, independently of the CPU of the system (e.g., allows another device to access a memory location of the system without going through the CPU). For example, in at least one embodiment, devices of the data storage system and PDs may be connected to, and communicate over, a PCIe bus using the NVMe protocol. In such an embodiment for a host/client read I/O operation, one or more DMA operations may be performed to read data from a PD where the read data may then be stored directly in a target memory location of the data storage system. The target memory location may be, for example, a memory location that is local to the DA (e.g., such as a local buffer of the DA, or a portion of data storage system global memory (GM) or cache that may be local to the DA) that initiated the data request to read data from the PD. In such an embodiment for a host write operation, one or more DMA operations may be performed to read data directly from a source memory location of the data storage system and then send the data to a PD whereby the data is written/stored on the PD. The source memory location may be, for example, a memory location that is local to the DA (e.g., such as a local buffer of the DA, or a portion of data storage system global memory (GM) or cache that may be local to the DA) that initiated the data request to write data to the PD. The foregoing and other aspects of techniques herein are described in more detail in following paragraphs.

Figure 3:
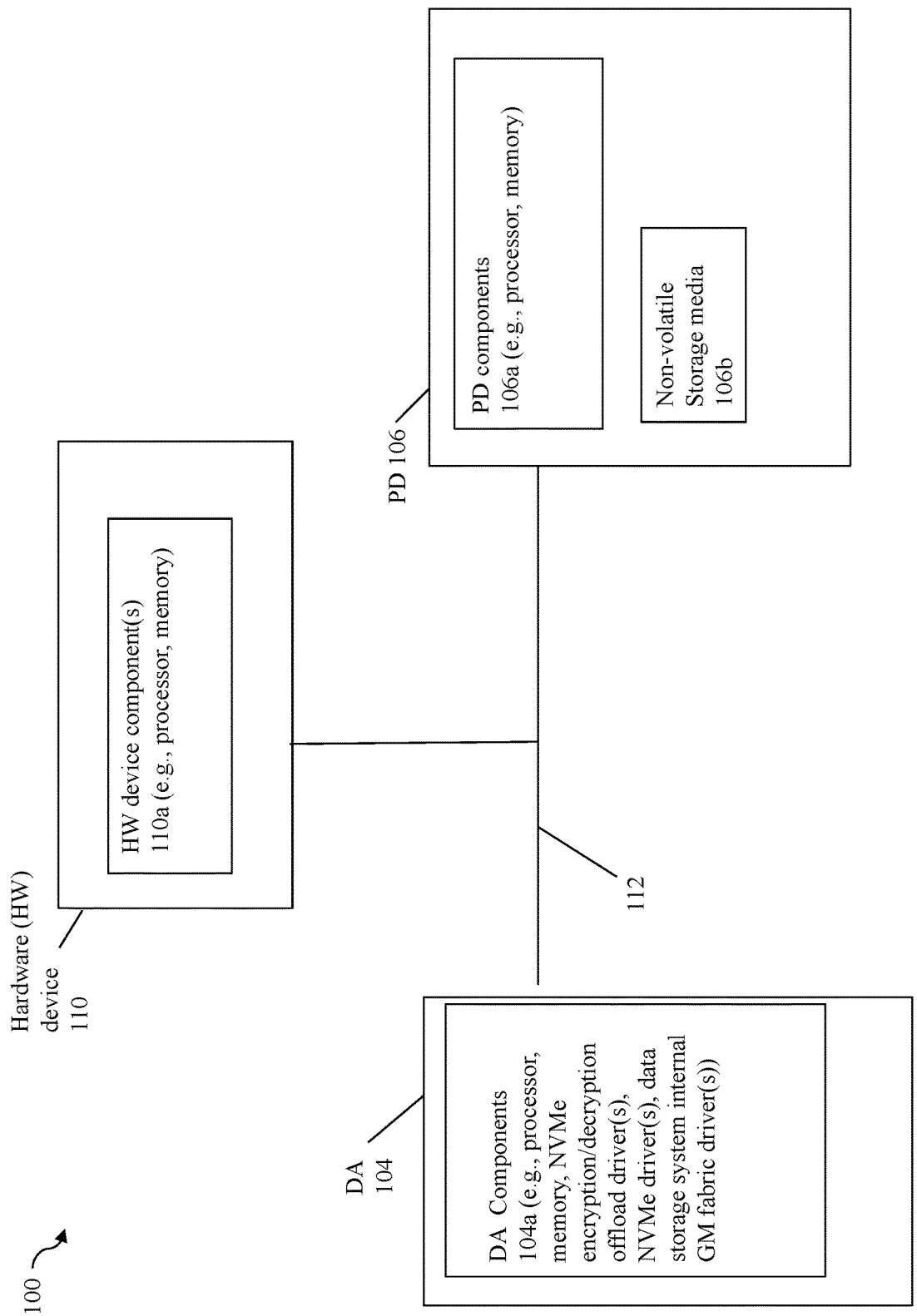
FIG. 3 is an example of devices configured to communicate over a PCIe bus that may be used in an embodiment in accordance with techniques herein.

Referring to FIG. 3, shown is an example 100 of devices that may be included in an embodiment in accordance with techniques herein. The example 100 includes a DA 104, hardware (HW) device 110, PD 106 and PCIe bus 112. Consistent with discussion above, the devices 104, 110 and 106 may all have connectivity to (directly or indirectly) and communicate over the PCIe bus 112. The DA 104 and PD 106 may be included in a data storage system. The HW device 110 may be an additional HW device used in connection with techniques herein to offload the encryption/decryption processing of the I/O path from the data storage system to the HW device 110.

The HW device 110 may include one or more additional HW device components 110a that are local to the HW device 110 and used by the HW device 110 in performing desired processing for operations or services. The components 110a may include, for example, one or more processors, memory, and the like.

The DA 104 may include one or more additional DA components 106a that are local to the DA 104 and may be used by the DA 104 in performing desired processing for operations or services in accordance with techniques herein. The components 104a may include, for example, one or more processors, memory, one or more drivers, and the like. In at least one embodiment, the components 106a may include memory that stores data for use in connection with techniques herein. For example, the DA memory of 104a may include one or more memory locations where data is stored as a source or target location of a DMA operation (e.g., data read from the PD 106 may be stored in a target memory location of the DA, data denoting results of encryption and decryption processing performed by the HW device 110 may be stored in a target memory location of the DA, data provided as a input or source to the HW device 110 or PD 106 may be stored in a source memory location of the DA). The components 104a of the DA 104 may include one or more drivers such as a driver used for communicating over the fabric for reading and writing data of the data storage system global memory (GM), described in more detail in following paragraphs. In at least one embodiment, the components 104a of the DA may include NVMe encryption/decryption offload driver(s) and NVMe driver(s). The NVMe encryption/decryption offload driver controls or drives the encryption and decryption of I/O data in connection with the I/O path in an embodiment in accordance with techniques herein. In at least one embodiment, the NVMe encryption/decryption offload driver programs or instructs the HW device 110 regarding what operations the HW device 110 is to perform in connection with encryption and decryption of I/O data on the I/O path. More generally, the NVMe encryption/decryption offload driver may program or instruct the HW device 110 to perform any desired processing as described herein. For example, the NVMe encryption/decryption offload driver programs or instructs the HW device to: perform DMA transfers of data between the HW device 110 and memory of the DA 104 (e.g., what data to fetch from what address of the DA 104's memory and what data to store to what target location/address in the DA 104's memory); perform processing for encryption or decryption of data obtained from memory of the DA 104; perform processing for data validation and integrity processing using metadata; and the like. In at least one embodiment, the NVMe driver may be used for communicating over the PCIe bus 112 in connection with techniques herein. The NVMe driver may program or instruct the PD 106 regarding what operations the PD is to perform in connection with techniques herein. For example, the NVMe driver may program or instruct the PD 106 to perform DMA transfers of data between the PD 106 and a target memory location in memory of the DA 104 (e.g., data transferred from memory of DA 104 to PD 106; data transferred from the PD 106 to memory of the DA 104), and the like.

The PD 106 may include one or more PD components 106a in addition to the non-volatile storage media 106b used to store data. The one or more components 106a may include, for example, one or more processors, memory, and the like.

It should be noted that the devices of the example 100 present a simplified view of devices that may be used in connection with techniques herein. As will be appreciated by those skilled in the art, there may be multiple DAs, multiple PDs and/or other devices connected to the PCIe bus 112, directly or indirectly.

As described in more detail elsewhere herein, the HW device 110 may perform processing, such as encryption and decryption in line as part of the I/O or data path in a loopback mode whereby the HW device 110 performs processing (e.g., encryption or decryption) of input or source data stored in DA memory and then stores the resultant output data (e.g., generated as an output of such processing) in the same or another location in DA memory. In at least one embodiment, the HW device 110 may be a microcontroller with firmware and hardware-assist functionality to perform desired service and operations, such as encryption and decryption. However, more generally, the HW device 110 may be implemented using any suitable hardware and known in the art. For example, in at least one embodiment, the HW device 110 may be implemented as an ASIC (application-specific integrated circuit) including one or more processors that execute code stored in any suitable form of memory of the ASIC to perform desired processing by the HW device 110 as described herein.

Before proceeding further with description regarding use of the HW device 110 and other devices in performing encryption and decryption in connection with techniques herein, what will first be described is a more detailed example of components of the data storage system, including a distributed global memory, in at least one embodiment in accordance with techniques herein.

Figure 4:
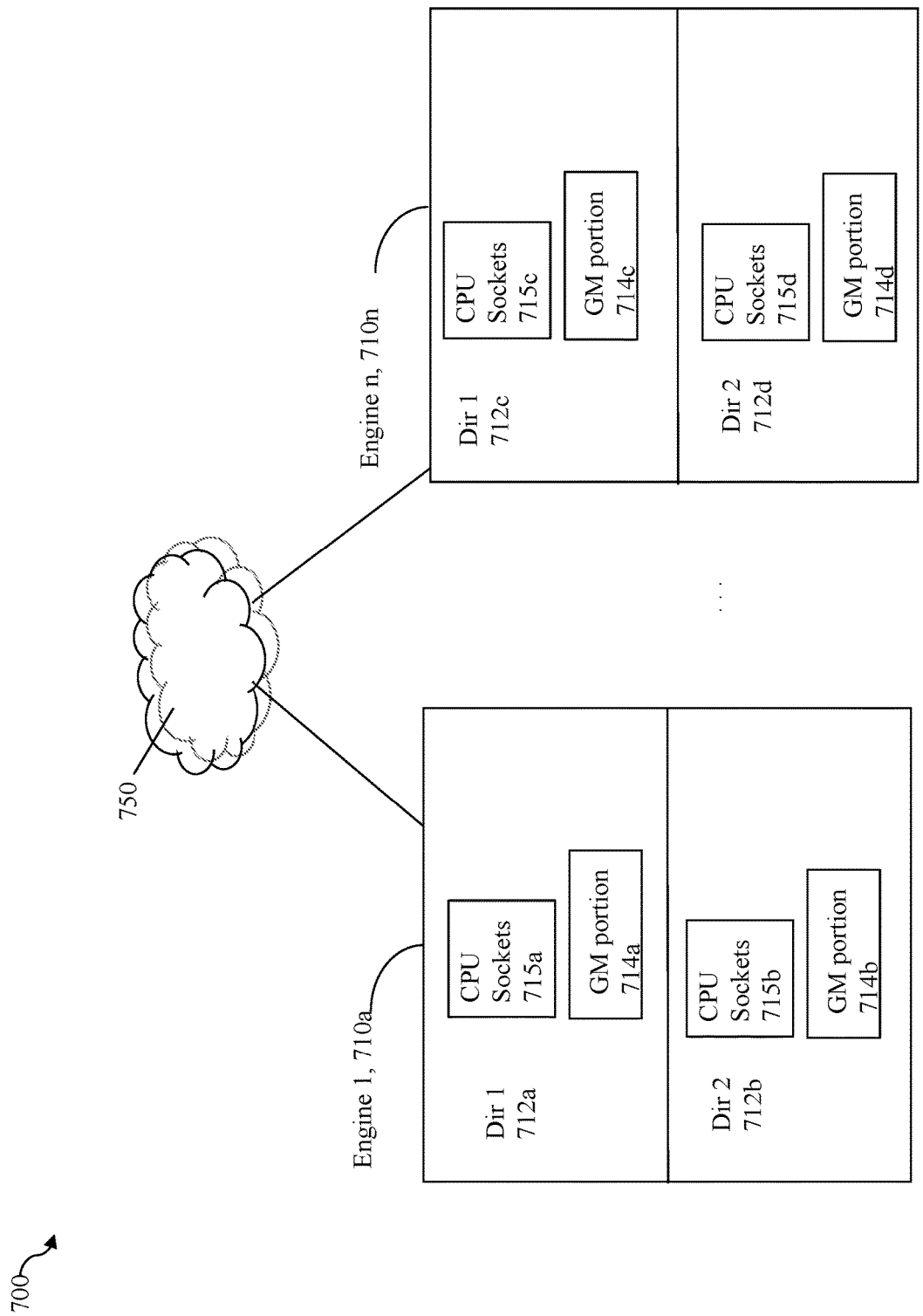
FIG. 4 is an example illustrating various components that may be included in a data storage system configuration in an embodiment in accordance with techniques herein.

Referring to FIG. 4, shown is an example of multiple engines as may be included in an embodiment of a data storage system in accordance with techniques herein. In this example 700, the data storage system may include a plurality of engines 710a-710n. Each of the engines 710a-710n may include components or devices thereon as illustrated. In particular, each of the engines may include two directors. Each of the directors may also include two CPU sockets each including a number of "cores" per CPU, and a portion of global memory so that the global memory of the data storage system is collectively all such portions of global memory distributed across the directors of the multiple engines. For example, engine 710a may include two directors 712a-b.

Each director of each of the engines 710a-n may have one or more front end interface connections that support connections to the hosts. Each director may also have one or more back end connections to physical backend storage devices (non-volatile storage devices) to access PDs. In this manner, each director with a front end interface connection may perform processing and function as an HA or FA as described herein. Each director with a connection to backend PDs (e.g., non-volatile storage devices) may perform processing and function as a DA as described herein. Additionally, a director may also perform processing and function as an RA as described herein, for example, in connection with remote replication. Thus, a single physical director may perform processing as any one or more of a DA, FA, and/or RA For example, in at least one embodiment, each of the two directors 712a-b may be configured to operate as a DA and/or FA as may be desired in a particular configuration such as, for example, to vary the number of DAs and/or FAs in a particular data storage system configuration. For example, in at least one embodiment, each of the directors of each of the engines may be configured to operate as both an FA and a DA so that each single director may both receive front end I/O requests from the host (e.g., FA) and also read data from/write data to physical storage devices (e.g., DA).

Each of the directors 712a, 712b of engine 710a, respectively, may also include a portion of global memory (GM) 714a, 714b and CPU sockets 715a, 715b. Each of the engines 710a-n may also include components similar to that as illustrated and described with respect to engine 710a. Directors across the engines 710a-710n may communicate over a fabric 750. The fabric 750 may include, for example, a switch and connections between the switch and engines 710a-710n. In at least one embodiment, the fabric 750 may be an IB fabric.

The GM portion of each director may be characterized as local with respect to that particular director. For example, director 712a include GM portion 714a which is memory that is local to that particular director. Data stored in GM portion 714a may be directly accessed by a CPU or core of the director 712a without having to use the fabric 750. For example, GM portion 714a may be memory (e.g., DIMM (dual inline memory module) DRAM (dynamic random access memory)) that is locally accessible by director 714a where data from one location in 714a may be copied to another location in 714a directly using DMA operations (e.g., local memory copy operations) issued by a processor 715a of director 712a. Thus, the director 712a may directly access data of 714a locally without communicating over the fabric 750 to access global memory. As an alternative, the director 712a may also use the fabric 750 to access data of 714a. Other GM portions 714b-d (e.g., other than GM portion 714a) that are not local with respect to director 712a may be accessed by director 712a but only using the fabric 750.

GM portion 714a may include information (as described in more detail below) that is accessed (e.g., for read and/or write) generally by any director of any of the engines 710a-n. Thus, for example, a director of any of the engines 710a-710n may communicate over the fabric 750 to access data in GM portion 714a. In a similar manner, any director of any of the engines 710a-n may generally communicate over fabric 750 to access any GM portion comprising the global memory. Although a particular GM portion, such as 714a may be locally accessible to one of the directors, such as director 712a, any other director of any engine 710a-n may generally access the GM portion 714a. Additionally, the director 712a may also use the fabric 750 for data transfers to and/or from GM portion 714a even though 714a is locally accessible to director 712a (without having to use the fabric 750).

In such an embodiment as in FIG. 4, the global memory (or parts thereof) of the data storage system used as the data cache may be distributed whereby different portions of the distributed global memory, and thus different portions of the data cache, are locally accessible to different directors (e.g., such as described in connection with FIG. 4 and elsewhere herein). Collectively, the data storage system global memory including GM portions (e.g., 714a-d) of all directors of all engines 710a-n may have a collective or aggregated logical GM address space whereby any director may access data stored in a GM location be reference to a GM address in the GM address space.

In at least one embodiment, there may be a maximum of 8 engines and thus 16 directors in a data storage system. The IB fabric may be used generally in embodiments with 1 or more engines (e.g., two or more directors) to facilitate communication and data transfers between directors.

In at least one embodiment in connection with techniques herein, the GM portion that is local to a director, such as DA 104 of FIG. 3, may be included in the DA components 104a for that particular DA. In connection with techniques herein and with reference back to FIG. 3, DMA transfers between DA 104 and other devices, such as PD 106 and HW device 110, connected to the PCIe bus may directly access memory locations of the GM portion local to director 104. For example, assume DA 104 includes GM portion 714a as "local" as described in connection with director 712a. In this case, DMA transfers in connection with techniques herein may be performed by directly accessing memory locations (e.g., cache locations using GM address locations) comprising GM portion 714a.

With reference back again to FIG. 3, the HW device 110, PD 106 and DA 104 may be connected to the same PCIe bus 112, directly or indirectly. For example, the HW device 110, PD 106 and DA 104 may all be directly connected to the same PCIe bus 112 and have different addresses on the same PCIe bus 112. As a variation illustrating indirect connections, the HW device 110 may be directly connected to a first PCIe bus (not illustrated) and have a first address on the first PCIe bus. The first PCIe bus may then be further connected to a second PCIe bus 112. The PD 106 and DA 104 may be directly connected to the second PCIe bus 112 and have different addresses on the second PCIe bus 112. As yet another variation illustrating possible indirect connections, the DA 104 and HW device 106 may be directly connected to a first PCIe bus 112 and have different addresses on the first PCIe bus 112. The first PCIe bus 112 may be connected to a second PCIe bus (not illustrated). The PD 104 may be directly connected to the second PCIe bus and have an address on the second PCIe bus. The foregoing are examples and additional variations are possible to provide desired connectivity between components and memory for use in performing techniques herein. More generally, the PD, DA and HW device have connectivity and communicate over one or more PCIe buses in connection with techniques herein.

In at least one embodiment in accordance with techniques herein, there is a first path over the one or more PCIe buses between the PD 106 and the DA 104 where a DMA operation is performed to move data therebetween over the first path (e.g., to read data from the PD 106 to the DA 104, the DMA operation moves data from the PD 106 to memory of the DA 104; to write data to the PD 106 from the DA 104, the DMA operation moves data from the memory of the DA 104 to the PD 106). Additionally, there is a second path over the one or more PCIe buses between the DA 104 and the HW device 110 used for DMA operations performed for data transfers between the DA 104 (e.g., memory of the DA) and the HW device 110 (e.g., memory of the HW device). Using the second path in connection with techniques herein, the HW device 110 fetches or reads the data from memory of the DA 104, performs processing (e.g., encryption or decryption) on the fetched data, and then stores or writes the results of the processed data in memory of the DA 104. Generally, the HW device 110 may read the data to be processed from a first memory location of the DA 104 and then store or write the results of the processed data to either the same first memory location of the DA 104 (e.g., thereby overwriting the original data that was processed) or a different second memory location of the DA 104.

Figure 5:
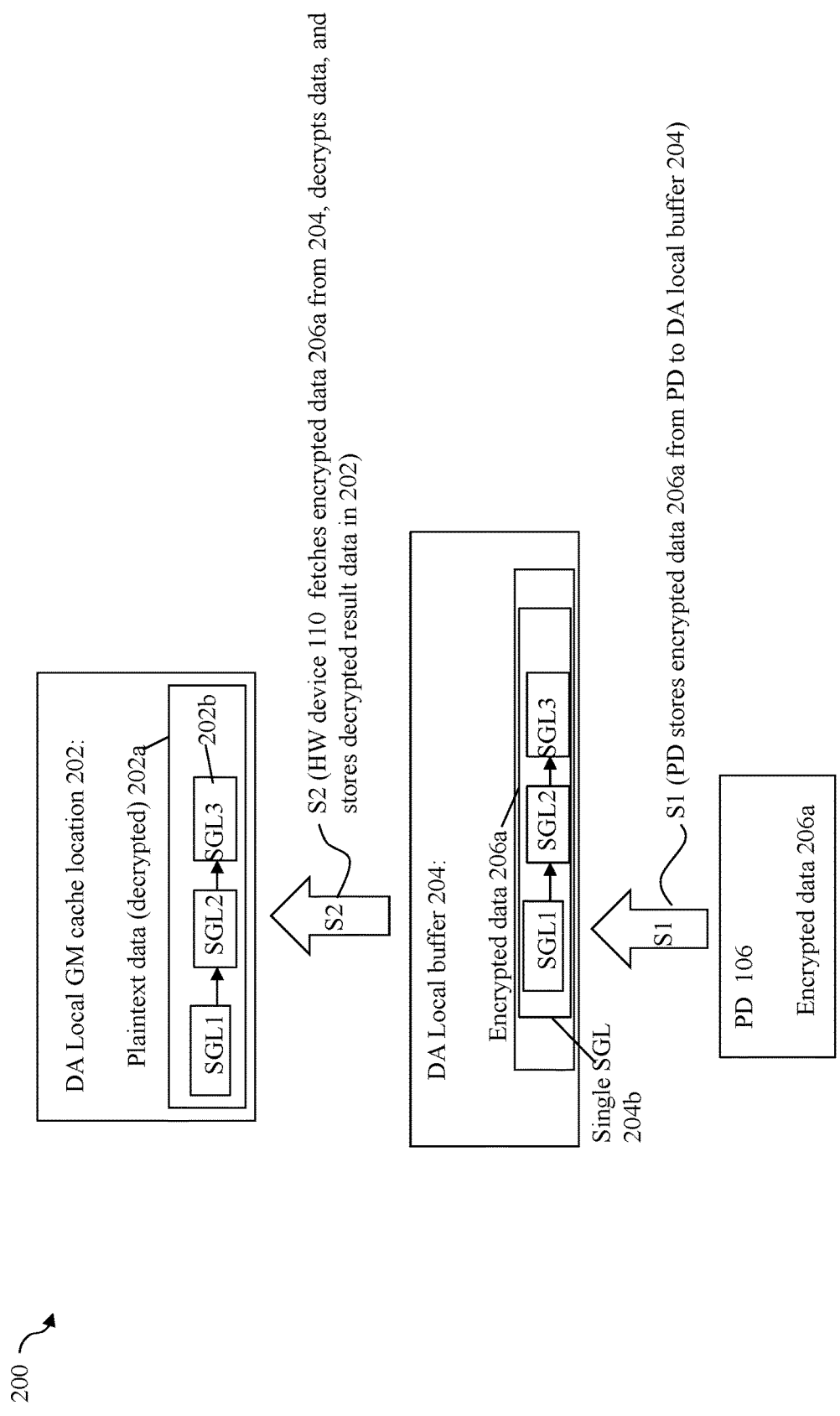
FIGS. 5, 6, 7, 8 and 9 illustrate components and data flows in an embodiment in accordance with techniques herein.

Referring to FIG. 5, shown is an example 200 of a first data flow illustrating use of techniques herein in connection with reading encrypted data from a PD. The data flow of 200 may denote processing performed, for example, as part of the data or I/O path in connection with reading encrypted data from a PD such as in connection with a reading requested data from a PD responsive to a read I/O request from a host or other data storage system client. In at least one embodiment, read processing may include determining that the requested read data is in cache (read hit) whereby the requested read data is already stored in the cache and returned to the requester. If the requested read data is not already in cache (read miss), the read data is retrieved from physical storage (e.g., PD), stored in cache, and then returned to the requester. The example 200 illustrates processing that may be performed in connection with read miss processing to read encrypted data from the PD, decrypt the data, and store the decrypted results in cache, such as a cache memory location in a GM portion local to a DA servicing the PD.

In connection with FIG. 5 and other examples of data flows herein (e.g., FIGS. 6, 7, 8 and 9), DMA transfers between the PD 106, HW device 110, and DA 104 are performed using the PCIe bus 112 as also described elsewhere herein. Additionally, in connection with FIG. 5 and other examples of data flows herein (e.g., FIGS. 6, 7, 8 and 9), data stored in the different portions of the distributed GM (e.g., 714a-d as in FIG. 4) may be accessed using DMA data transfers such as over the IB fabric 750.

In the example 200 (as well as in other subsequent figures such as FIGS. 6, 7, 8 and 9), elements 202 and 204 denote 2 different memory locations that are local to the DA. In at least one embodiment, memory locations 202, 204 may be included in the GM portion local to the DA. Element 202 may denote a cache location of the GM. Thus, data stored in cache location 202 may also be accessed by other devices or components, such as other directors, of the data storage system. Element 204 may be local buffer of the DA and may denote memory of the GM portion local to the DA. Element 204 may be, for example, a cache location of the GM used as a scratch or temporary buffer by the DA for the processing illustrated (e.g., cache location is allocated for use temporarily by the DA and while so allocated is not available for data caching and use by other directors). Alternatively, and more generally, an embodiment may use another memory location for 204 that is local to the DA but may or may not be include as part of the data cache of the GM. For example, in at least one embodiment, a DA may also have a private local memory portion that is also local to the DA but not included in the GM accessible for use by all other directors. Although element 202 is illustrated as being a single cache slot as described as such in connection with following figures and paragraphs, element 202 may denote more generally one or more cache slots of the GM that are local to the DA.

In step S1, the PD 206 may perform a DMA transfer of the encrypted data 206a to a DA local buffer 204. S1 may be performed by the NVMe driver of DA 104 instructing or programming the PD 106 to perform the DMA transfer that stores the encrypted data 206a from the PD into the local DA buffer 204. In step S2, the NVMe encryption/decryption offload driver may instruct or program the HW device 110 to perform processing to fetch and decrypt the encrypted data 206a and store the decrypted or plaintext data 202a in DA local GM cache location 202. In at least one embodiment, step S2 may include the NVMe encryption/decryption offload driver instructing or programming the HW device 110 to perform a one or more DMA transfers that fetches the encrypted data 206a from the DA local buffer 204 and stores the encrypted data 206a in memory of the HW device 110. The HW device 110 then performs the desired processing including decryption processing and then issues one or more additional DMAs that store the decrypted result data 202a in the DA local GM cache location 202. Element 204b denotes a particular format or form (e.g., using a scatter gather list (SGL) described in more detail elsewhere herein) of the encrypted data 206a used for DMA transfers. In a similar manner, element 202b denotes a particular format or form of the decrypted data 202a. Paragraphs below provide further detail in connection with 202b and 204b as may be used in at least one embodiment in accordance with techniques herein.

In at least one embodiment, the HW device 110 may perform decryption processing and optionally other desired processing inline as part of the data or I/O path. In at least one embodiment, the HW device 110 may perform other processing including data validation and integrity checking of the read data obtained from the PD. In at least one embodiment, metadata (MD) chunks may be stored and transferred with each data portion of a specified size. For example, for each 512 byte chunk or portion of user data, one embodiment may store an additional 8 bytes of MD describing the user data chunk. The MD may include information used in connection with validating the integrity of the associated user data chunk. For example, the MD may include checksum information, CRC (cyclic redundancy check) information, and the like, that may be used to validate the integrity of the user data chunk read from the PD. As known in the art, such MD may be used, for example, to detect corrupted user data as may occur when there was a problem reading the user data from the PD, when the user data stored on the PD has been corrupted such as due to a problem with the PD, and the like. In this manner, the MD as well as the user data may be stored in an encrypted form which is decrypted by the HW device 110. Subsequently, the HW device may perform additional processing including data validation and integrity checking using the MD of a particular data portion to ensure that the particular data portion is valid (e.g., has not been corrupted) as denoted by the MD. In the event the data validation fails, in at least one embodiment the HW device may report the data validation failure to the DA or other component for a suitable further responsive action to be taken. For example, the HW device may report the data validation failure to a driver of the DA where the driver may perform other processing, for example, to correct the user data (e.g., such as by having the NVMe driver instruct the PD 106 to resend the data), update or modify the user data and/or MD, and the like.

In at least one embodiment, the HW device may also optionally perform additional processing (e.g., inline as part of the data or I/O path) for other data services that may be enabled or in use with the user data. For example, data deduplication services and compression/decompression services may be used in connection with stored user data. Data deduplication is known in the art where a single instance of a data portion may be stored and a token, reference or pointer to the single stored instance of the actual data is used. Duplicates of the same data portion may be detected, for example, in the same or multiple storage entities. In this manner with deduplication, rather than store multiple copies of the same data portion, a single instance of the data portion is stored and each of the multiple occurrences of the same data portion uses a reference or token to the same single stored data instance thereby reducing the amount physical storage needed. With deduplication, additional processing may be performed when reading and writing data. With the example 200 when reading data from a PD, the additional processing may include, for example, replacing any tokens or references to deduplicated data portions with the actual data portion. In an embodiment in which the user data is stored in a compressed form on the PD 106, the additional processing performed by the HD device may include decompressing the user data. In at least one embodiment in which both deduplication and compression/decompression are enabled and performed for user data, compression/decompression may be performed if the user data is not a duplicate/has not been deduplicated. In this manner, an embodiment in accordance with techniques herein may have the HW device 110 perform any desired additional processing on the data read from the PD as part of the I/O path or data path in order to further offload such processing from the data storage system to the HW device 110.

As such, efficiency and performance of the data storage system may be further improved by having the HW device 110 perform any other desired processing on the same data portion for which decryption is being performed in connection with the data flow of the example 200.

As a further optimization for improved efficiency when performing DMA transfers in the data flow 200 as well as other exemplary data flows herein (e.g., FIGS. 6, 7, 8 and 9), an embodiment in accordance with techniques herein may combine multiple data portions that are stored at logically adjacent, (e.g., consecutive and contiguous) logical device addresses into a single combined data portion. The multiple data portions are stored at logically contiguous or consecutive logical block addresses (LBAs) of the same LUN's logical address space. Additionally, such as when performing a single DMA transfer of the multiple data portions, the multiple data portions are stored at contiguous or consecutive logical memory locations or addresses in a buffer. For example, as described in more detail elsewhere herein, the encrypted data 206a may represent multiple data portions which are stored at logically contiguous or consecutive logical block addresses (LBAs) of the same LUN's logical address space, and where the data 206a is stored in consecutive or contiguous memory locations such as of a memory buffer in PD 106, and where the data 206a is transferred in a single DMA transfer to DA local buffer 204 (where DA local buffer 204 is a contiguous or consecutive set of memory locations of the DA 104). Without combining the multiple data portions, a different series of processing steps with multiple DMAs may be issued for each of the multiple data portions such as when transferring data between the PD 106 and the data storage system (e.g., memory of the DA 104). Thus, as discussed in more detail below, combining the multiple data portions into a single representation of data to be transferred via a single DMA transfer reduces the number of DMA transfers over the PCIe bus.

In at least one embodiment using the NVMe protocol, PRP (physical region page) and SGL (scatter gather list) layouts or formats are used to describe DMA data transfers. PRPs and SGLs are known in the art. Generally, any command format or layout supported by the protocol, such as NVMe, may be used. Assume for illustration purposes that SGLs are used for DMA transfers in this example. Each SGL may be a separate structure or set of structures that describes a single data portion being transferred. When multiple data portions and associated SGL representations are combined into a single SGL denoting the combined data portions, the single SGL may denote a single structure or single set of structures that describe collectively a single data transfer of the multiple data portions that each also have its own SGL. In connection with performing a DMA transfer with techniques herein between devices connected to the PCIe bus such as in FIG. 3, the single SGL may be used for a single DMA data transfer as opposed to possibly performing multiple DMA data transfers for the multiple SGLs/data portions (e.g., one SGL, and thus one data portion, transferred per DMA transfer). For example, referring to FIG. 5 and consistent with discussion above, assume element 204b denotes the form of the encrypted data 206a, and element 202b denotes the form of the decrypted data 202a. Further, assume the encrypted data 206a/104b is a combined single data portion denoting a combination of 3 different data portions stored, respectively, at LBAs 3, 4, and 5 for which decryption was performed, and where each of the 3 data portions has their own individual characteristic MD (e.g., varies with the data portion). The single SGL 204b may denote the single SGL for the combined 3 data portions and 3 associated MD chunks. As illustrated in 204b, the single SGL 204b may represent an encrypted form of 3 individual SGLs where each of the 3 SGLs may denote a different single one of the 3 data portions and the MD chunk of that single data portion. In connection with techniques herein, the multiple data portions may be included a combined representation of a single SGL 204b which is transferred in a single DMA in encrypted form in step S1 (from PD to DA local buffer 204). In at least one embodiment in accordance with techniques herein, the PD may be instructed or programmed to transfer the single SGL 204b to DA local buffer 204. where the single SGL may be transferred in a single DMA. Step S1 is performed without MD validation for the 3 individual data portions (e.g., because decryption of the data must be performed prior to being able to perform MD validation). In step S1, the 3 data portions represented as a single SGL 204b are also stored contiguously in memory in the single DA local buffer 204. Subsequent to S1, S2 is performed.

In step S2, the HW device considers and recognizes the encrypted data in DA local buffer 204 as 3 separate encrypted SGLs, each with its own data portion and distinguishing MD, and performs decryption and data validation individually for each of the 3 SGLs (e.g., performs decryption and data validation for a first data portion and first MD of first SGL; performs decryption and data validation for a second data portion and second MD of second SGL; and performs decryption and data validation for a third data portion and third MD of third SGL). In connection with S2, the HW device may fetch the encrypted 3 SGLs of 206a from the DA local buffer 204 and store the 3 SGLs in memory of the HW device for processing including decryption and data validation. In at least one embodiment, the offset within the single SGL 204b (and thus within 204) for each of the encrypted 3 SGLs may be known and the HW device may fetch each of the encrypted 3 SGLs individually resulting in 3 separate DMA transfers (one DMA transfer per SGL). More generally when the single SGL 204b includes "N" encrypted SGLs for N combined data portions and associated N MD chunks, in at least one embodiment, the HW device may fetch each of encrypted N SGLs by issuing a separate command and thus a separate DMA transfer. In turn, once the HW device has fetched the encrypted 3 SGLs of 206a, the HW device decrypts each of the 3 separate SGLs 202b, one SGL for each of the 3 data portions and associated MD chunks; and then performs data validation processing on each of the 3 data portions individually using that particular data portion's MD chunk. The 3 SGLs 202b may denote 3 separate single structure/sets of structures where each of the 3 SGLs of 202b describes a different one of the 3 data portions and its associated MD. In this example, the 3 data portions are logically consecutively or contiguously located adjacent to one another in the same logical address space of the same LUN. Thus, in S1, techniques herein combine the 3 data portions/3 SGLs into a single representation denoted as the single SGL 204b having a single structure or set of structures that collectively describes the combined 3 data portions/3 SGLs. The single SGL 204b may be transferred using a single DMA in S1. After S1 once the single SGL has reached the DA local buffer, in S2, the HW device may fetch each of the 3 SGLs individually (e.g., by issuing 3 instructions, one per SGL), and perform decryption and data validation individually on each of the 3 SGLs representing a single data portion and its MD. Subsequently, the HW device may then store the decrypted 3 SGLs 202b for the 3 LBAs 3, 4, and 5 into the DA local GM cache location 202 as denoted by 202a. The 3 data portions for LBAs 3, 4 and 5 may be, for example, data returned in connection with 3 different host read I/O operations. In at least one embodiment in connection with storing the decrypted 3 SGLs 202b in DA local GM cache location 202, the HW device may store each of the 3 SGLs individually (e.g., by issuing 3 instructions one per SGL) into DA local GM cache location 202 at a particular offset within 202. When the decrypted data 202a is written to location 202, it can alternatively be written into 3 different addresses or locations that may or may not be contiguous. That is, in this example and others herein, although the HW device performing S2 stores the 3 decrypted SGLs 202*b* in memory locations that are adjacent to one another in DA local cache location 202, each of the 3 decrypted SGLs of 202*b* may alternatively be stored in 3 different target memory locations in GM or other DA local memory where the 3 target memory locations are not contiguous or consecutive memory locations (as is the case with 202 in the example 200).

As discussed above in connection with S2, the HW device 110 may fetch the encrypted 3 SGLs from DA local buffer 204 (e.g., such as by performing 3 DMAs); perform processing including decryption and data validation on each of the encrypted 3 SGLs; and then store the 3 decrypted SGLs (e.g., decrypted data 202*a*) in the DA local GM cache location 202 (e.g., such as by performing 3 DMAs). In at least one embodiment, a DMA transfer may be performed by the HW device to store each of the decrypted SGLs in the representation 202*b*. Thus, if the encrypted data 206*a* only includes a single SGL for a single data portion, S2 may perform a single DMA transfer to store all of the decrypted data 202*a* in the DA local GM cache location 202. If the encrypted data 206*a* includes 3 SGLs for 3 data portions when decrypted as in 202*b*, S2 may perform a first series of 3 DMA transfers (e.g., one per SGL) to fetch the 3 encrypted SGLs of 206*a*, perform decryption and data validation on each of the 3 data portions and 3 MD chunks represented by the 3 SGLs; and then perform a second series of 3 DMA transfers (e.g., one per SGL) to store all 3 decrypted SGLs of the decrypted data 202*a* in the DA local GM cache location 202.

Figure 6:
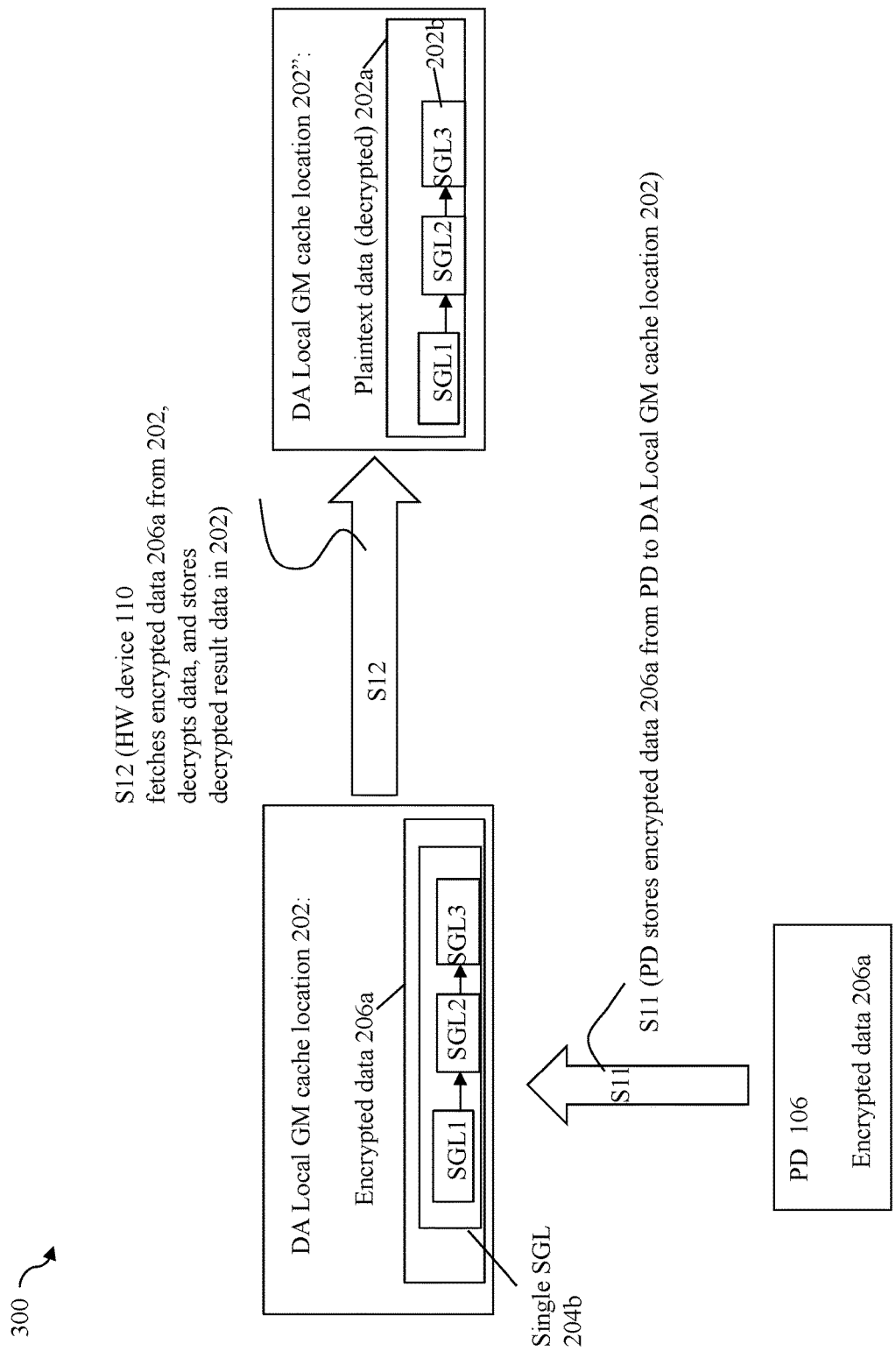

Referring to FIG. 6, shown is another example 300 illustrating another data flow using techniques herein in connection with reading encrypted data from a PD. In a manner similar to that as described above in connection with FIG. 5, the data flow of 300 may denote processing performed, for example, as part of the data or I/O path in connection with reading encrypted data from a PD such as in connection with a reading requested data from a PD responsive to a read I/O request from a host or other data storage system client. Generally, the example 300 illustrates processing performed that is similar to the example 200 of FIG. 5 described above with the difference that the processing performs in-place decryption whereby the resulting decrypted data 202*a* is stored in the same DA memory location 202 as the original encrypted data 206*a* thereby overwriting the encrypted data 206*a*. In contrast to 300, the example 200 of FIG. 5 stores the resulting decrypted data 202*a* in a different memory location 202 than the first memory location 204 including the original encrypted data 206*a*. In connection with the example 300 of FIG. 6 for in-place decryption, element 202 denotes the DA local GM cache location before the decryption, or more generally prior to the data transformation processing performed in S12, and element 202" denotes the DA local GM cache location after the decryption, or more generally after the data transformation processing performed in S12.

The example 300 includes a first step S11 which is similar to S1 as described in connection with the example 200 of FIG. 5 with the difference that in S11, the single DMA transfers the encrypted data 206*a* from the PD to the DA local GM cache location 202 (rather than the buffer 204 as in S1). Subsequently, step S12 is performed whereby S12 is similar to step S2 described in connection with the example 200 of FIG. 5 with the difference that S12 reads the encrypted data 206*a* as 3 separate SGLs from DA memory location 202 (rather than buffer 204 as in S2) and then stores the decrypted result data 202*a* (that includes decomposed SGLs 202*b*) to DA memory location 202 (thereby overwriting the original source encrypted data 206*a*). In a manner as described above in connection with S2, in S12 the HW device reads the encrypted data 206*a* as 3 decomposed SGLs from DA memory location 202, such as performing 3 DMAs, one per SGL. In at least one embodiment, S2 and similarly S12 may include also performing decryption and data validation and integrity checking using the MD chunks for each of the 2 SGLs/data portions of 202*a*/202*b*, as well as any other additional processing desired (e.g., for other data services such as decompression, deduplication, and the like) as part of the I/O or data path such as discussed above in connection with FIG. 5. In a manner as described above, in S12 once decryption and data validation and integrity processing has been completed by the HW device, the HW device stores the decrypted data 202*a* as 3 decomposed SGLs from DA memory location 202", such as performing 3 DMAs, one per SGL.

Figure 7:
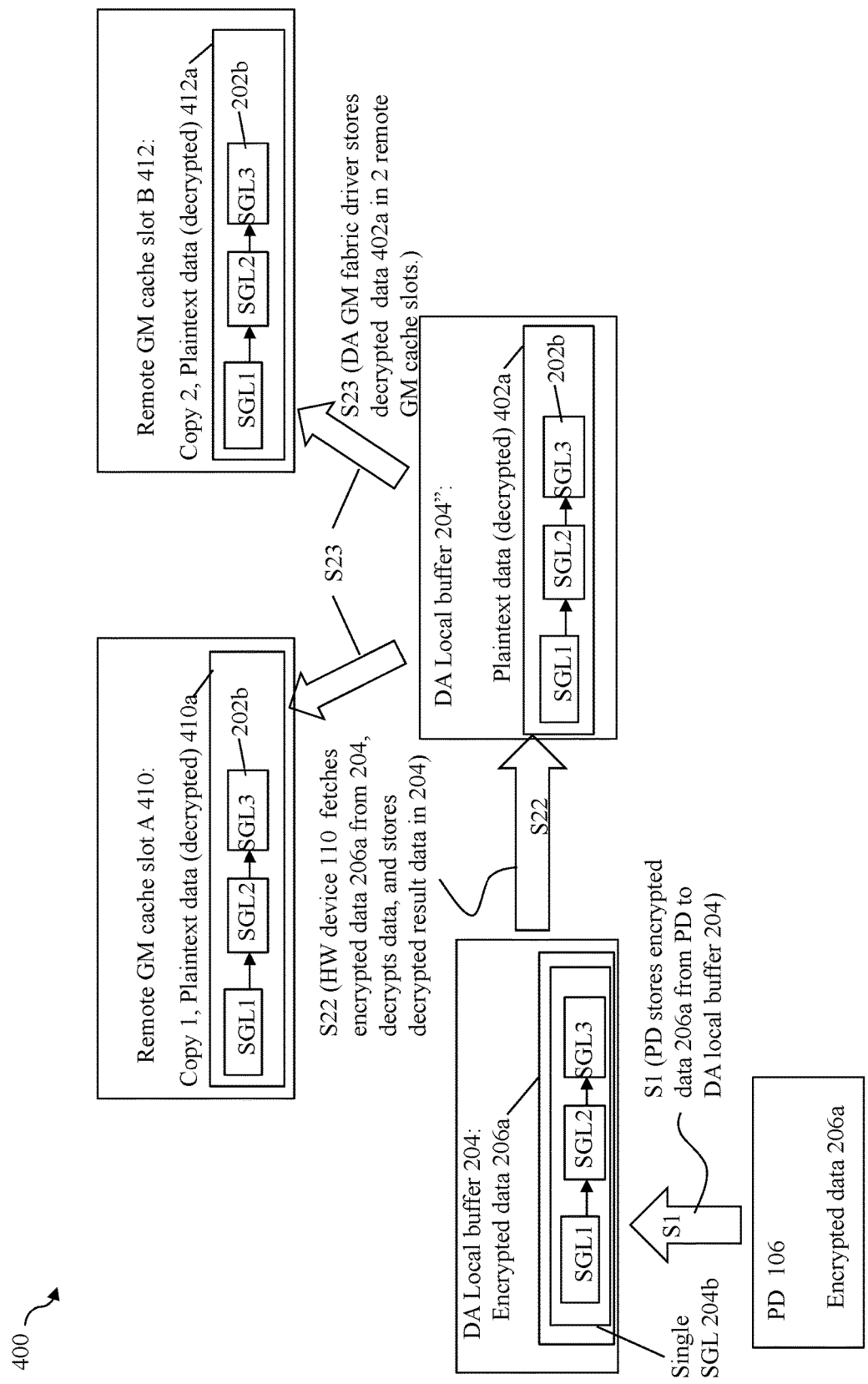

Referring to FIG. 7, shown is another example 400 illustrating a data flow using techniques herein in connection with reading encrypted data from a PD. In a manner similar to that as described above in connection with FIGS. 5 and 6, the data flow of 400 may denote processing performed, for example, as part of the data or I/O path in connection with reading encrypted data from a PD such as in connection with a reading requested data from a PD responsive to a read I/O request from a host or other data storage system client. Generally, the example 400 illustrates processing performed that is similar to the example 200 of FIG. 5 and example 300 of FIG. 6 described above. In the example 400 of FIG. 7, the processing performs in place decryption whereby the resulting decrypted data 402*a* is stored in the same DA local buffer 204 as the original encrypted data 206*a* thereby overwriting the encrypted data 206*a*. Additionally, in the example 400 the decrypted data 402*a* is mirrored in different remote GM cache slots. Element 204 denotes the contents of the DA local buffer prior to performing step S22 processing and element 204" denotes the contents of the DA local buffer after performing step S22 processing. The foregoing is described in more detail below.

The example 400 includes a first step S1 as described in connection with the example 200 of FIG. 5 where the single DMA transfers the encrypted data 206*a* from the PD to the DA local buffer 204 as a single SGL. Subsequently following step S1, step S22 is performed whereby S22 is similar to step S12 described in connection with the example 300 of FIG. 6 with the difference that S22 reads the encrypted data 206*a* as 3 SGLs from DA local buffer 204 and then stores the decrypted result data 402*a* in its decrypted and decomposed, multiple SGL form 202*b*. In S22, the HW device reads the encrypted data 206*a* as 3 decomposed SGLs from DA local buffer 204 such as by performing 3 DMAs, one per SGL. In at least one embodiment, S22 may include also performing decryption and data validation and integrity checking using the MD for each of the 3 SGLs of data 402*a*, as well as any other additional processing desired (e.g., for other data services such as decompression, deduplication, and the like) as part of the I/O or data path such as discussed above in connection with FIGS. 5 and 6. In S22, once decryption and data validation and integrity processing has been completed by the HW device, the HW device stores the decrypted data 402*a* as 3 decrypted and decomposed SGLs 202*b*/402*a* into DA local buffer 204", such as by performing 3 DMAs, one per SGL.

Following step S22, step S23 may be performed within the data storage system. In step S23, the DA may perform processing, such as by a DA GM fabric driver of the data storage system, whereby the decrypted data 402a is copied or mirrored in two different remote GM cache slots 410 and 412 using a DMA driver of the DA. For example, each of the GM cache slots 410, 412 may be in a different DA other than the DA including the local buffer 204. In connection with mirroring 402a, the decomposed and decrypted multiple SGLs 202b of 402a are transferred to the GMA cache slots 410, 412 using the IB fabric 750 (e.g., used for accessing GM locations that are not local to the DA including the DA local buffer 204). In at least one embodiment, S23 may include also performing data validation and integrity checking using the MD for 402a (e.g., the DA GM fabric driver of the data storage system may perform such data validation and integrity checking to verify/validate that the expected correct data 402a was received and stored in remote GM cache slots 410, 412). In at least one embodiment in accordance with techniques herein, such remote GM slot mirroring in GM cache slots 410, 412 may be performed to avoid data loss of cached data. Storing duplicates of cached data in different GM cache slots 410, 412 of different DAs, different boards and/or different engines may provide for duplicate copies of cached data in the event of device or component failure (e.g., where the failed device or component (e.g., DA, engine or board) includes one of the copies of the cached data, another second copy of the cached data remains in a cache slot of a functional component).

Consistent with discussion in other examples in at least one embodiment in which the encrypted data 206a includes 3 SGLs, decryption and data validation and integrity checking of S22 may be performed per SGL where such data validation for a single SGL uses the particular MD of that SGL. In the example 400 where the decrypted data 402a/202b includes 3 SGLs, data validation and integrity checking of S23 may similarly be performed per SGL using that particular SGL's MD. In at least one embodiment, S23 may include the DA GM fabric driver performing a single DMA to store a single one of the SGLs of 202b in a single one of the cache slots 410, 412. Thus, the 3 SGLs of 202b/402a may be transferred from 204" to 410 by performing 3 DMAs (one per SGL of 202b) and may be transferred from 204" to 412 by performing another 3 DMAs (one per SGL of 202b).

In connection with FIG. 7, although both cache slots 410, 412 as illustrated as "remote" or not local with respect to the DA having the local buffer 204, it may be that one of the cache slots 410, 412 is actually local with respect to the DA having the local buffer 204. Furthermore, although each of 410, 412 denote a single remote cache slot whereby all of the 3 SGLs 202b are stored in each such cache slot, each of 410, 412 denote more generally one or more remote cache slots (remote with respect to the DA having local buffer 204) which are cache target locations located anywhere in the distributed GM of the data storage system. Thus, a single DMA data transfer over the IB fabric 750 may be used to access each such cache slot.

Figure 8:
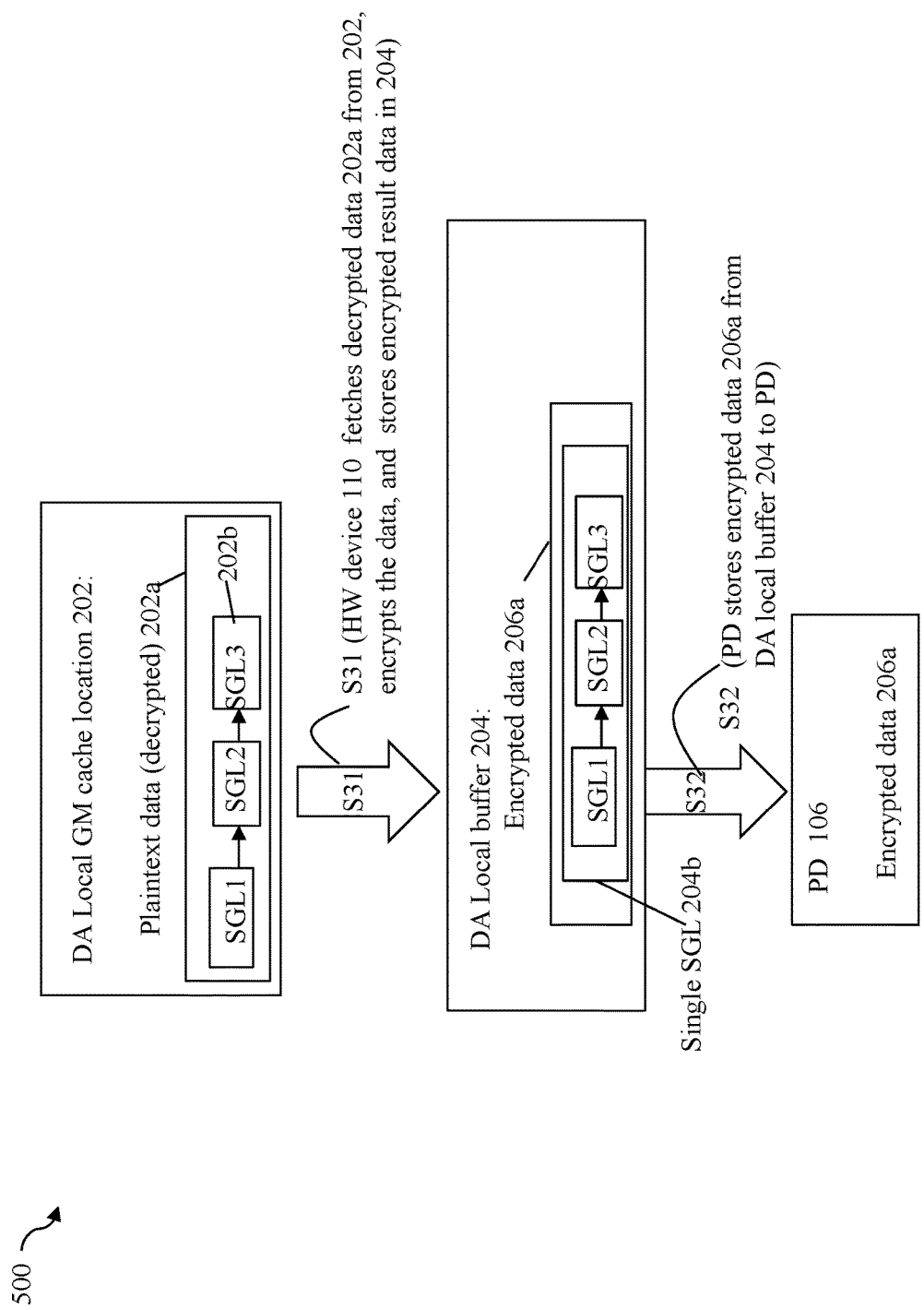

Referring to FIG. 8, shown is an example 500 illustrating another data flow using techniques herein in connection with writing encrypted data to a PD. The data flow of 500 may denote processing performed, for example, as part of the data or I/O path in connection with writing encrypted data to a PD such as in connection with a writing or destaging cached data to a PD where the cached data may be, for example, write I/O data written by a host or other data storage system client. In at least one embodiment, write processing may include storing the write data to a cache slot and then, at a later point, destaging the cached write data to physical storage backend storage such as to a PD. The example 500 illustrates processing that may be performed in connection with writing out cached data to a PD where such processing generally includes reading decrypted data, encrypting the data, and storing the encrypted data results to a PD.

In step S31, the HW device 110 may fetch (e.g., via a first or more DMA transfers, such as one DMA transfer per SGL of 202a/202b) the decrypted data 202a from the DA local GM cache location 202 and store the decrypted data 202a in memory of the HW device 110. The HW device 110 may then perform processing to encrypt the data 202a as well as any additional processing as part of the data or I/O path as described herein. In the example 500, such additional processing in connection with writing data out to a PD may optionally include performing any one or more of: data validation checking (e.g., using the MD associated with the decrypted data 202a), data deduplication processing for storing or writing data to the PD, data compression, and the like. Consistent with discussion above with other examples, S31 may include the HW device fetching each of the 3 decrypted SGLs 202b/202a (e.g., such as by performing 3 DMAs, one per SGL); performing data validation and integrity processing on each of the SGLs individually using the MD and data of that individual SGL; performing encryption processing individually of each of the 3 SGLs; and then storing each of the encrypted SGLs 204b/206a in the DA local buffer 204 (e.g., such as by performing 3 DMAs, one per SGL). Thus S31 includes the HW device fetching the multiple SGLs 202b individually (e.g., one DMA per SGL) while the HW device also performs MD validation and encryption for each data portion/each SGL. In this example, the multiple encrypted SGLs of 206a are stored in memory contiguously in the DA local buffer 204. In S32, the entire encrypted data 206a is transferred to PD as a single SGL 204b/single DMA transfer. Thus, in S31, the HW device fetches the data 202b/202a from 202 and also stores the data 206a into 204 as multiple SGLs/using multiple DMAs (e.g. one DMA per SGL). Following S31, S32 is performed. In connection with S32, the NVMe driver instructs the PD to treat the encrypted data 206a in DA local buffer 204 as single (combined) data portion using a single SGL 204b which is written/stored to the PD 106 as a single SGL 204b using a single DMA.

When storing or writing a current data portion, data deduplication processing may include calculating a hash value or digest for the current data portion where the hash value or digest may be mapped to an index into a data store to determine whether the data store already includes a copy of the data portion (whereby the current data portion is a duplicate of an existing already stored data portion), or whether the data store does not already included the current data portion. If the current data portion is a duplicate of an existing data portion already in the data store, a token or reference to the data portion may be used to refer to the current data portion in a data set rather than store another duplicate copy. As such, the HW device may perform processing in connection with writing a data portion to a PD to calculate the hash value or digest of the data portion used to determine whether to deduplicate the data portion when storing a data set to avoid storing copies of the same data.

As a further optimization for improved efficiency as discussed elsewhere herein, an embodiment in accordance with techniques herein may combine multiple data portions that are stored at logically adjacent, (e.g., consecutive and contiguous) logical device addresses into a single combined data portion. The multiple data portions are stored at logically contiguous or consecutive logical block addresses (LBAs) of the same LUN's logical address space. Furthermore, the multiple SGLs that represent the multiple data portions are stored at contiguous memory locations, such as the 3 SGLs 206a are stored in contiguous memory locations of DA local buffer 204. In at least one embodiment using the NVMe protocol, SGLs may be used to describe the data of the DMA transfers. Thus, part of the processing in S31 may include the HW device storing the multiple encrypted SGLs 202b for multiple data portions contiguously in DA local buffer 204, where such data portions are logically consecutively or contiguously located adjacent to one another in the same logical address space of the same LUN (e.g., similar to that as described above in connection with other figures such as FIG. 5). The encrypted data 206a including multiple SGLs stored in contiguous memory locations of 204 may be represented as a single SGL and treated in S32 as a single "combined" data portion transferred from 204 to PD 106 with a single SGL/single DMA operation.

Thus, after completion of S31, S32 may be performed where the NVMe driver instructs or programs the PD 106 to store, via a single DMA transfer, the encrypted data 206a from the DA local buffer 204 to the PD 106.

Figure 9:
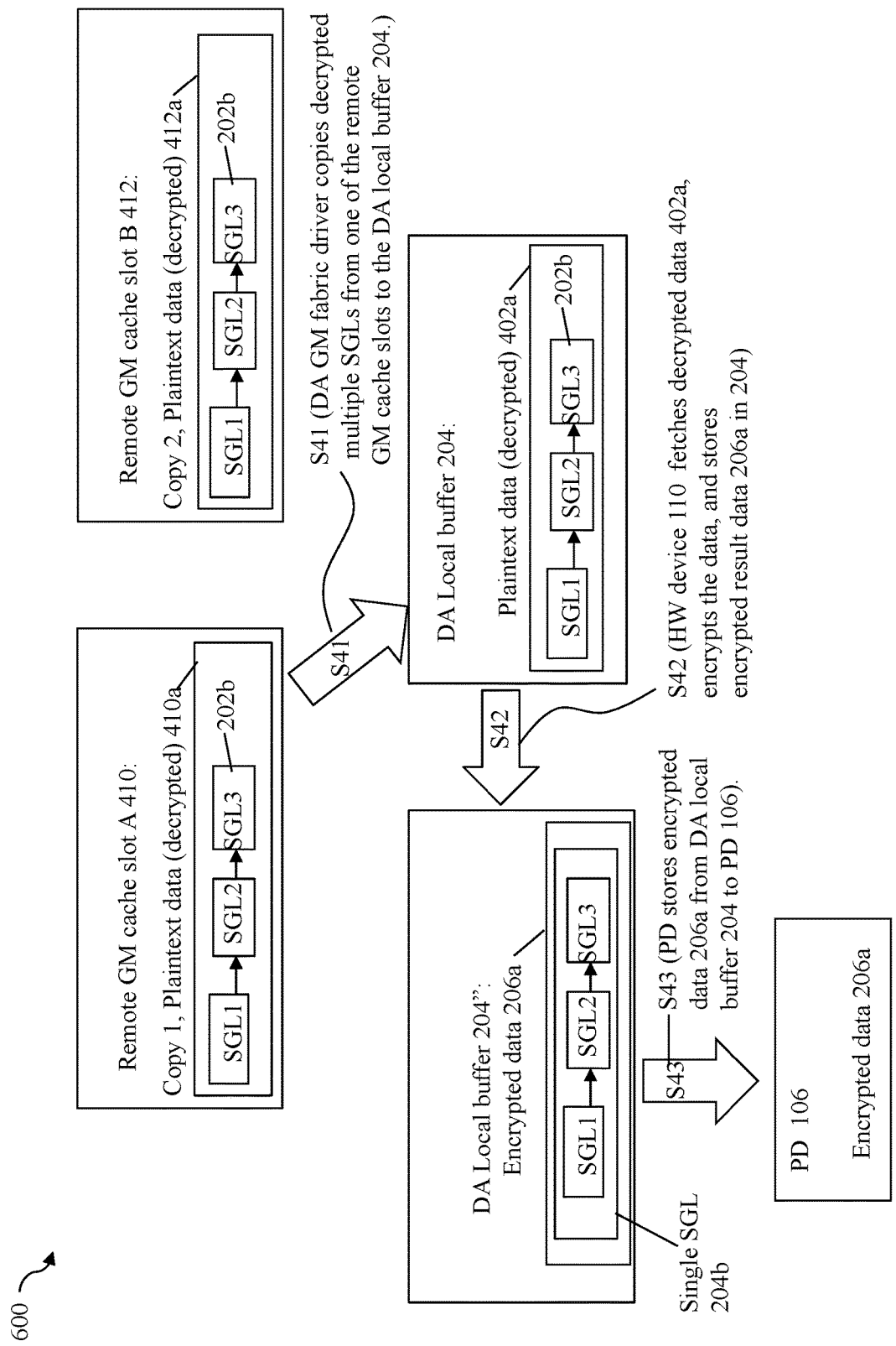

Referring to FIG. 9, shown is an example 600 illustrating another data flow using techniques herein in connection with writing encrypted data to a PD. The data flow of 600 may denote processing performed, for example, as part of the data or I/O path in connection with writing encrypted data to a PD such as in connection with a writing or destaging cached data to a PD where the cached data may be, for example, write I/O data written by a host or other data storage system client. In at least one embodiment, write processing may include storing the write data to a cache slot and then, at a later point, destaging the cached write data to physical storage backend storage such as to a PD. The example 600 is similar in aspects to the example 500 of FIG. 8 (e.g., involving writing out data to a PD) and also to the example 400 FIG. 7 (e.g., involving remote GM cache slots including the desired data being written to the PD). The example 600 illustrates processing that may be performed in connection with writing out cached data to a PD where such processing generally includes reading decrypted data from cache, encrypting the data, and storing the encrypted data results to a PD.

In step S41, the DA GM fabric driver of a DA of the data storage system may obtain the decrypted data 410a from remote GM cache slot 410, using the IB fabric 750, and store the decrypted data as 402a in the DA's local buffer 204. It should be noted that in the example 600, it is assumed that multiple copies 410a, 412a of the decrypted data 202b are stored, respectively, in cache slots 410, 412, where one of the copies 410a, 412a is selected as the source copy to use for processing in connection with step S41.

In connection with the example 600 of FIG. 9, although both cache slots 410, 412 as illustrated as "remote" or not local with respect to the DA having the local buffer 204, it may be that one of the cache slots 410, 412 is actually local with respect to the DA having the local buffer 204. In such a case, the particular one of the GM cache slots 410, 412 that is local with respect to the DA may be selected as the source copy for use in connection with S41. Furthermore, although each of 410, 412 denote a single remote cache slot whereby all of the 3 SGLs 202b are stored in each such cache slot, each of 410, 412 denote more generally one or more remote cache slots (remote with respect to the DA having local buffer 204) which are cache source locations located anywhere in the distributed GM of the data storage system. Thus, a single DMA data transfer over the IB fabric 750 may be used to access each such cache slot, for example, if each the 3 SGLs 202b are located in a different remote cache slot. In the example 600, 204 denotes the contents of the DA local buffer prior to performing S42 and 204" denotes the contents of the DA local buffer after performing S42.

Following step S41, step S42 may be performed. S42 is similar in aspects to S31 of FIG. 8. In step S42, the NVMe encryption/decryption offload driver(s) instructs the HW device 110 to fetch (e.g., via a first or more DMA transfers, such as one DMA transfer per SGL of 202a/202b) the decrypted data 402a/202b from the DA local buffer 204 and store the decrypted data 402a/202b in memory of the HW device 110. The HW device 110 may then perform processing to encrypt the data 402a/202b as well as any additional processing as part of the data or I/O path as described herein such as in connection with S31 of the example 500 of FIG. 8. In the example 600, such additional processing in connection with writing data out to a PD may optionally include performing any one or more of: data validation checking (e.g., using the MD associated with each of the SGLs of the decrypted data 402a), data deduplication processing for storing or writing data to the PD, data compression, and the like. Consistent with discussion above with other examples, S42 may include the HW device fetching each of the 3 decrypted SGLs 202b/402a from DA local buffer 204 (e.g., such as by performing 3 DMAs, one per SGL); performing data validation and integrity processing on each of the SGLs individually using the MD and data of that individual SGL; performing encryption processing individually of each of the 3 SGLs; and then storing each of the encrypted SGLs 204b/206a in the DA local buffer 204" (e.g., such as by performing 3 DMAs, one per SGL). Thus S42 includes the HW device fetching the multiple SGLs 202b/402a individually (e.g., one DMA per SGL) while the HW device also performs MD validation and encryption for each data portion/each SGL. In this example, the multiple encrypted SGLs of 206a are stored in memory contiguously in the DA local buffer 204". In S43, the entire encrypted data in 204b is transferred to PD 106 as a single SGL/single DMA transfer. Thus, in S42, the HW device stores the data encrypted data 206a into the DA local buffer 204" as multiple SGLs/using multiple DMAs (e.g. one DMA per SGL). Following S42, S43 is performed. In connection with S42, the NVMe driver instructs the PD to treat data in DA local buffer 204" as a single (combined) data portion using a single SGL 204b which is written/stored to the PD 106 as a single SGL 204b using a single DMA.

As noted above, when storing or writing a current data portion, data deduplication processing may include calculating a hash value for the current data portion. As such in S42, the HW device may perform processing in connection with writing a data portion to a PD to calculate the hash value or digest of the data portion used to determine whether to deduplicate the data portion when storing a data set to avoid storing copies of the same data. After the HW device completes the desired processing of the 3 SGLs and generates the resulting 3 encrypted SGLs, the HW device 110 then transfers the 3 encrypted SGLs 206a, such as using 3 DMA, one per SGL, that stores the 3 encrypted SGLs contiguously in DA local buffer 204 as denoted by the encrypted result data 206a in the DA local buffer 204. In the example 600, completion of step S42 results in overwriting the DA local buffer as denoted by 204" whereby the original decrypted data 402a of 204 is now overwritten in 204" with the encrypted data 206a. As a further optimization for improved efficiency as discussed elsewhere herein, an embodiment in accordance with techniques herein may combine multiple data portions that are stored at logically adjacent, (e.g., consecutive and contiguous) logical device addresses into a single combined data portion. The multiple data portions are stored at logically contiguous or consecutive logical block addresses (LBAs) of the same LUN's logical address space. Furthermore, the multiple SGLs that represent the multiple data portions are stored at contiguous memory locations, such as the 3 SGLs 206a are stored in contiguous memory locations of DA local buffer 204". In at least one embodiment using the NVMe protocol, SGLs may be used to describe the data of the DMA transfers. Thus, part of the processing in S42 may include the HW device storing the multiple encrypted SGLs 202b for multiple data portions contiguously in DA local buffer 204", where such data portions are logically consecutively or contiguously located adjacent to one another in the same logical address space of the same LUN (e.g., similar to that as described above in connection with other figures such as FIG. 5). The encrypted data 206a including multiple SGLs stored in contiguous memory locations of 204 may be represented as a single SGL and treated in S43 as a single "combined" data portion transferred from 204" to PD 106 with a single SGL/single DMA operation.

After completion of S42, S43 may be performed where the NVMe driver instructs or programs the PD 106 to store, via a single DMA transfer, the encrypted data 206a from the DA local buffer 204 to the PD 106.

Generally, the foregoing describes various embodiments in which high performance encryption/decryption of data may be performed while also preserving data integrity capabilities (along with optionally other specified processing). The foregoing techniques and embodiments leverage a HW device, such as a hardware-based controller, that may efficiently perform integrity checking of individual data portions (e.g., fine-grained) while using DMA data transfers. Additionally, such techniques may provide for coalescing of multiple data portions from multiple different locations, such as different GM cache locations, into a single memory buffer, where such multiple data portions are located at consecutive or contiguous logical addresses of the same logical device address space. In this manner, the multiple data portions may be represented as a collective combined single data portion having a single data representation, such as using a single SGL or PRP DMA descriptor where the combined single data portion (via the single descriptor) may be transferred with a single DMA data transfer (e.g., read or write). The number of overall data transfers involved, such as between the PDs and the data storage system (e.g., DAs) may be minimized by performing (via the HW device) the data validation and integrity checking inline as part of the data or I/O path for a data portion also being encrypted or decrypted (by the HW device). The foregoing avoids unnecessary processing operations and data transfers by performing the data validation and integrity checking (and possibly other operations) for a data portion while the data portion is currently stored/loaded on the HW device for performing processing such as encryption or decryption. As also described herein, the HW device may also perform other data-related operations such as generation of hashes or other suitable checksums (e.g., in connection with data deduplication), data compression/decompression, and the like, to minimize extra processing steps of the overall I/O flow of the I/O or data path.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
   performing a first DMA (direct memory access) operation that transfers first data from a physical storage device to a first memory location of a data storage system, wherein the first data is stored in the first memory location in an encrypted form;
   performing at least a second DMA operation that transfers the first data in the encrypted form from the first memory location of the data storage system to a hardware device;
   performing first processing by the hardware device, the first processing including:
      decrypting the first data and generating decrypted first data; and
   performing at least one DMA operation that transfers the decrypted first data from the hardware device to at least one second memory location of the data storage system.

2. The method of claim 1, wherein the physical storage device is a non-volatile memory device connected, over at least one communication bus, to the hardware device and the data storage system.

3. The method of claim 2, wherein the first DMA operation, the at least second DMA operation, and the at least one DMA operation are performed using the at least one communication bus.

4. The method of claim 1, wherein the at least one second memory location is the first memory location and after, transferring the decrypted first data, the decrypted first data overwrites the first data stored at the first memory location in the encrypted form.

5. The method of claim 1, wherein the at least one second memory location is a different memory location than the first memory location.

6. The method of claim 1, wherein the first data in the encrypted form includes a single descriptor that describes a plurality of data portions transferred by the first DMA operation.

7. The method of claim 6, wherein the plurality of data portions are stored at contiguous consecutive logical addresses of a logical address range of a logical device.

8. The method of claim 7, wherein the single descriptor in the encrypted form represents a plurality of descriptors, in the encrypted form, for the plurality of data portions represented by the single descriptor.

9. The method of claim 8, further comprising:
   performing a plurality of DMA operations that transfer the plurality of descriptors in the encrypted form from the first memory location of the data storage system to a hardware device; and
   performing a plurality of DMA operations that transfer the plurality of descriptors from the hardware device to the at least one second memory location of the data storage system.

10. The method of claim 1, wherein the first processing includes the hardware device performing at least one of: data validation and integrity checking using metadata included in the first data, one or more processing operations of data deduplication processing, and one or more processing operations of decompression processing.

11. The method of claim 1, wherein the first DMA operation, the at least second DMA operation, the first processing, and the at least one DMA operation are performed as operations of the I/O path for a read I/O operation.

12. The method of claim 1, further comprising performing second processing of the I/O path for a write I/O operation that writes second data.

13. The method of claim 12, wherein the second processing includes:
 performing at least a third DMA operation that transfers second data from a third memory location of the data storage system to the hardware device, wherein the second data is stored in the third memory location in a decrypted form;
 performing third processing by the hardware device, the third processing including:
  encrypting the second data and generating encrypted second data; and
 performing at least a fourth DMA operation that transfers the encrypted second data from the hardware device to a target memory location of the data storage system; and
 performing a fifth DMA operation that transfers the encrypted second data from the target memory location of the data storage system to a second physical storage device of the data storage system.

14. The method of claim 13, wherein the second data includes a plurality of descriptors describing a plurality of data portions stored at contiguous consecutive logical addresses of a logical address space of a logical device.

15. The method of claim 14, wherein a single descriptor represents the plurality of descriptors and denotes a combined data representation of the plurality of data portions.

16. The method of claim 15, wherein the single descriptor is included in the encrypted second data transferred by the fifth DMA operation.

17. The method of claim 16, wherein the plurality of data portions represented by the single descriptor are written to the second physical storage device providing provisioned storage for the logical device.

18. The method of claim 13, wherein the third processing includes the hardware device performing at least one of: data validation and integrity checking using metadata included in the second data, computing a hash value in connection with data deduplication processing, and one or more processing operations of compression processing.

19. A non-transitory computer readable medium comprising code stored therein that, when executed performs a method of processing I/O operations comprising:
 performing a first DMA (direct memory access) operation that transfers first data from a physical storage device to a first memory location of a data storage system, wherein the first data is stored in the first memory location in an encrypted form;
 performing at least a second DMA operation that transfers the first data in the encrypted form from the first memory location of the data storage system to a hardware device;
 performing first processing by the hardware device, the first processing including:
  decrypting the first data and generating decrypted first data; and
 performing at least one DMA operation that transfers the decrypted first data from the hardware device to at least one second memory location of the data storage system.

20. A system comprising:
 at least one processor; and
 a memory comprising code stored therein that, when executed, performs a method of processing I/O operations comprising:
  performing a first DMA (direct memory access) operation that transfers first data from a physical storage device to a first memory location of a data storage system, wherein the first data is stored in the first memory location in an encrypted form;
  performing at least a second DMA operation that transfers the first data in the encrypted form from the first memory location of the data storage system to a hardware device;
  performing first processing by the hardware device, the first processing including:
   decrypting the first data and generating decrypted first data; and
  performing at least one DMA operation that transfers the decrypted first data from the hardware device to at least one second memory location of the data storage system.

* * * * *